United States Patent [19]

Kimura

[11] Patent Number: 4,550,306

[45] Date of Patent: Oct. 29, 1985

[54] SIGNAL TRANSMISSION SYSTEM FOR FIRE ALARM JUNCTION LINE

[75] Inventor: Tetsuo Kimura, Tokyo, Japan

[73] Assignee: Nittan Company, Limited, Tokyo, Japan

[21] Appl. No.: 441,752

[22] Filed: Nov. 15, 1982

[30] Foreign Application Priority Data

Nov. 16, 1981 [JP] Japan .................................. 56-182238

[51] Int. Cl.[4] .......................... H04B 3/54; H04B 3/38; G08B 29/00
[52] U.S. Cl. .............................. 340/310 R; 179/170 J; 307/1; 340/291; 340/577; 375/36
[58] Field of Search ................... 307/1, 4; 340/310 R, 340/310 A, 291, 538, 577; 455/14, 15; 179/170 J; 375/36

[56] References Cited

U.S. PATENT DOCUMENTS

| 4,208,653 | 6/1980 | Abe | 340/870.39 |
| 4,316,262 | 2/1982 | Mizuta | 340/310 A |
| 4,423,506 | 12/1983 | Kimura | 375/36 |

Primary Examiner—James J. Groody
Attorney, Agent, or Firm—Abelman Frayne Rezac & Schwab

[57] ABSTRACT

A novel signal transmission system, having a junction line comprised of a power source line, a grounding line and a signal line is disclosed. Two complementarily operative transistors are connected in series between the power source line and the grounding line. Signals are sent out from the junction point of the two transistors to the signal line. The speed for transmitting the signals is effectively increased due to the quick charge and discharge of the signal line.

7 Claims, 4 Drawing Figures (a)

(b)

4,550,306

SIGNAL TRANSMISSION SYSTEM FOR FIRE ALARM JUNCTION LINE

TECHNICAL FIELD OF THE INVENTION

This invention relates to a signal transmission system for a fire alarm junction line.

BACKGROUND OF THE INVENTION

An example of the conventional signal transmission system for a fire alarm junction line is shown in FIG. 1. In FIG. 1, on the receiving unit side, a junction line $L_{11}$ is connected to a power source through a resistor R, and the collector electrode and the emitter electrode of a transistor $T_1$ are respectively connected to the junction line $L_{11}$ and another junction line $L_{12}$ and a binary signal is applied to the base electrode of the transistor $T_1$ so that a signal is sent out. On the repeater unit side, the sent-out signal is restored to its original state from a received waveform by distinguishing the potential of the junction line $L_{11}$ with the aid of a comparator circuit $A_{12}$. Another transistor $T_2$ which is similar to the transistor $T_1$ is provided on the repeater unit side and binary signals are applied to the base electrode of the transistor $T_2$, thus a signal sent out from the repeater can be restored on the receiving unit side by means of another comparator circuit $A_{11}$ which is similar to the comparator circuit $A_{12}$. A plurality of fire detectors, not shown in the figure, are connected to the repeater and the code (number) of the fire detector that has issued a fire alarm signal is reported to the receiving unit by the repeater, while a signal for controlling smoke prevention and/or exhaust equipment can be sent to the repeater from the receiving unit side. As a plurality of repeaters are connected to a pair of junction lines, centralized administration of a plurality of fire detectors is possible with a junction line comprising a pair of wires.

However, when the number of repeaters connected to one pair of wires is increased and a plurality of fire detectors are connected to each repeater, signals must be sent out and received at a high speed through the junction line in order to transmit more detailed information. In the circuit as described above, a signal as shown in FIG. 2(a), which has been sent out is received in the waveform as shown in FIG. 2(b). The reason for this is as follows: When the transistor $T_1$ turns ON, the potential of the junction line $L_{11}$ drops immediately to zero potential. However, when the transistor $T_1$ turns OFF, it takes some time for the junction line $L_{11}$, which has a certain static capacity, to be charged by the battery through the resistor R. Accordingly, the conventional signal transmission system is defective in that the signals sent out at a high speed cannot be appropriately received on the receiving unit side. If a resistor R with lower resistance is used in order to alleviate the above-mentioned defect, the voltage drop due to the resistance of the junction line $L_{11}$ becomes larger during the ON state of the transistor $T_2$ when a signal is sent from the repeater side, and distinction of signals on the receiving unit side becomes difficult. In addition, this difficulty will be aggravated owing to the difference in the length of the junction line $L_{11}$ to each repeater, and in the worst case the signals cannot be distinguished on the receiving unit side. So employment of a resistor $R_1$ of lower resistance is impractical.

The object of this invention is to provide a signal transmission system for a fire alarm junction line in which signals can be transmitted at a high speed between a fire alarm receiving unit and a plurality of repeaters, in which the defects of the prior art systems are diminished.

DISCLOSURE OF THE INVENTION

This invention provides a signal transmission system for a fire alarm junction line whereby information on the conditions of operation of a plurality of fire detectors, signals for controlling equipment for prevention of spread of fire and exhaust of smoke, etc. are transmitted between repeaters to which fire detectors are connected and a receiving unit of a fire alarm system, wherein the junction line comprises three wires, one wire of said junction line being a power source line connected to a power source on the receiving unit side, another wire of said junction line being a grounding line connected to the ground, and the third wire of said junction line being a signal line which is connected to the junction point of a serial connection of a first switching element and a second switching element, said serially connected switching elements being connected between the power source line and the grounding line and operating complementarily with each other, and a binary signal of a zero potential and a power source potential being applied to the control terminals of the two switching elements to send out a signal to the junction line.

The serial connection circuit of the first and the second switching elements may be provided respectively at the receiving unit side and the repeater side whereby the switching elements are forcibly turned OFF by a gate signal under the normal condition. Then, signals can be transmitted in any direction by removing the gate signal at the time when signals are transmitted.

In addition, the repeaters can be electrically energized by the power source line and the grounding line.

Further, connection of the signal line to the power source line or to the grounding line through a high resistance resistor can effectively eliminate any instability in the potential of the signal line which may be caused when the signal line is not used.

BRIEF DESCRIPTION OF THE DRAWINGS

This invention will now be described in detail in reference to the accompanying drawings, wherein.

DETAILED DESCRIPTION OF THE INVENTION

Figure 1:
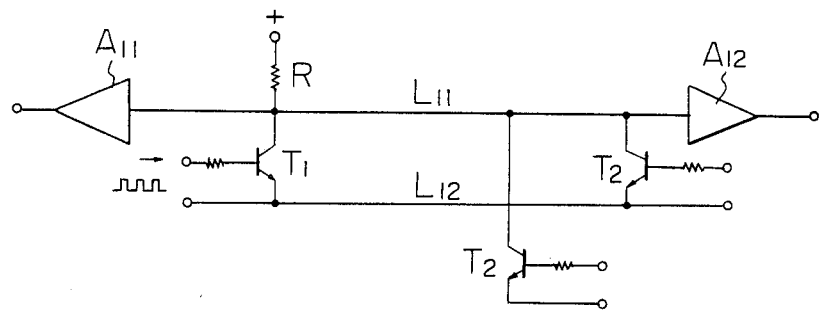
FIG. 1 is a circuit diagram showing an example of the prior art signal transmission system for a fire alarm junction line, FIG. 2 includes time charts showing the sent-out signal and the received waveform of the above prior art system.
Figure 2:
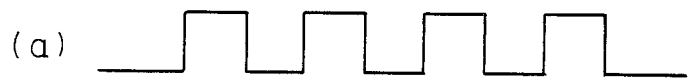
Figure 2:

FIGS. 1 and 2 have already been referred to in the above description of the prior art.

Figure 3:
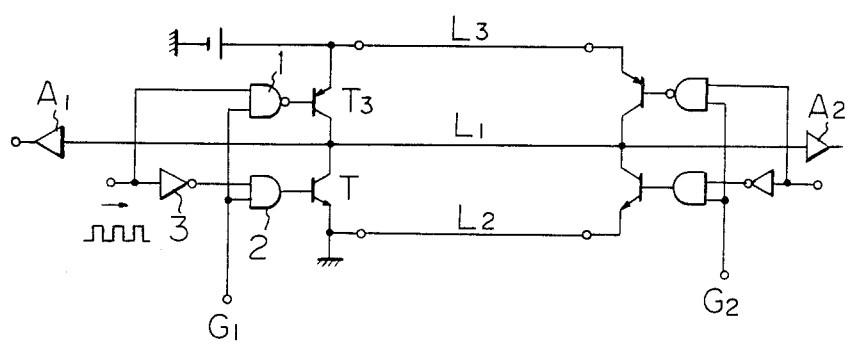
FIG. 3 is a circuit diagram showing an embodiment of the signal transmission system for a fire alarm junction line of this invention and FIG. 4 illustrates two preferred circuit configurations for stabilizing the signal line in accordance with the invention.

In FIG. 3, the junction line comprises a signal line $L_1$ for transmitting signals, a grounding line $L_2$ and a power source line $L_3$ connected to a power source on a fire alarm receiving unit side. A PNP transistor $T_3$ and an NPN transistor $T_4$ are connected serially between the power source line $L_3$ and the grounding line $L_2$.

More particularly, the emitter electrode of the PNP transistor $T_3$ is connected to the power source line $L_3$, the collector electrode of the PNP transistor $T_3$ is connected to the collector electrode of the NPN transistor $T_4$ and the emitter electrode of the NPN transistor $T_4$ is connected to the grounding line $L_2$. The junction between the collectors of the two transistors is connected to the signal line $L_1$. The base electrode of the PNP transistor $T_3$ is connected to the output terminal of a NAND circuit 1 and the base electrode of the NPN transistor $T_4$ is connected to the output terminal of an AND circuit 2. A binary signal is applied to one input terminal of the NAND circuit 1 and to one input terminal of the AND circuit 2 through an inverter 3. The other input terminals of the NAND circuit 1 and the AND circuit 2 are connected to a gate terminal $G_1$ in common.

When a high level signal is applied to the gate terminal $G_1$, the AND circuit 2 turns the transistor $T_4$ ON and OFF in response to the input binary signal and the NAND circuit 1 turns the transistor $T_3$ OFF and ON in response to the same input binary signal. The ON and OFF operations of the transistors $T_3$ and $T_4$ are reverse and complementary to each other, that is, when one transistor is ON the other transistor is OFF, while when one transistor is OFF, the other transistor is ON. In other words, the transistors $T_3$ and $T_4$ constitute a first and second switching elements, operating complementarily. The voltage of the power source is sent to the signal line 1 through the transistor $T_3$ when the transistor is ON, and the signal line $L_1$ is grounded when the transistor $T_4$ is ON. As the resistance between the emitter electrode and the collector electrode of each of the transistors $T_3$ and $T_4$ is quite small in the ON state thereof, the signal line $L_1$ can be quickly charged and discharged. In other words, the signal line $L_1$ can quickly respond to the high speed input binary signals.

When a low level signal is applied to the gate terminal $G_1$, the output of the NAND circuit 1 assumes high level and the transistor $T_3$ turns OFF, and the output of the AND circuit 2 assumes low level and the transistor $T_4$ is still in the OFF state. That is, the signal line $L_1$ is not connected to the power source or to the ground, so the signal line $L_1$ can receive the signals that are sent from the other side. The signals received are judged by a comparator $A_1$ as "1" or "0" for instance after being compared with one-half of the voltage of the power source, for example.

A circuit similar to the above is provided on the repeater side and the signals can be sent from the repeater side to the receiving unit side when a gate terminal $G_2$ that is provided on the repeater side is at high level. At the same time, the signals received can be judged by a comparator $A_2$ that is provided on the repeater side. The low level is normally supplied to the gate terminals $G_1$ and $G_2$ and the receiver is always in the standby condition so as to receive signals. At the start of sending signals, the gate terminal $G_1$ or $G_2$ is turned to high level to enable the sending of the signals.

A plurality of repeaters can be connected in parallel. In such a case, the circuits are linked so that when the high level is supplied to the gate terminal $G_2$ by any one of the repeaters, the other repeaters are turned to low level. This connection is necessary to avoid any interference in signals due to the simultaneous output of the signals from two or more repeaters and to prevent flow of a large current due to the simultaneous ON state of the PNP transistor of one repeater and the NPN transistor of the other repeater. Also the circuits are designed so that the high level signal is not applied to the gate terminal $G_1$ of the receiving unit side simultaneously with the gate terminal $G_2$ of the repeater side. A resistor may be connected between the collector terminals of the transistors $T_3$ and $T_4$ so as to decrease the ON current even when a momentary ON current flows because of failure of the transistors $T_3$ and $T_4$, so that both transistors are on for a short period. The impedance between the lines can be set low in this embodiment, so that less noise is induced. Also tolerance of the static capacitance between the lines is much higher.

In the above-described embodiment, it is quite convenient that electric power can be supplied to any repeater not shown in the drawing on the repeater side by the power source line $L_3$ and the grounding line $L_2$.

Figure 4:
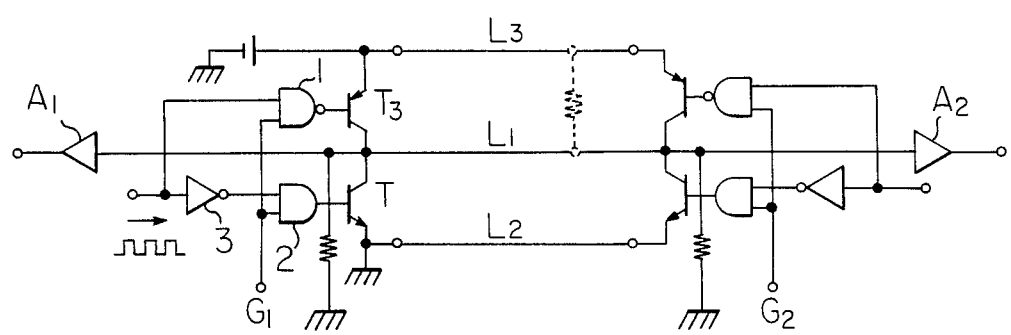

In this embodiment, the electric potential of the signal line $L_1$ is liable to be unstable because the signal line $L_1$ is not connected to the power source line $L_3$ or to the grounding line $L_2$ when any one of the gate terminals is at the low level. The electric potential is made stable to eliminate the defect stated above by connecting the signal line $L_1$ to the power source line $L_3$ or to the grounding line $L_2$ through a high resistance. In FIG. 4, the two resistors shown in solid lines connect the signal line $L_1$ to the grounding line $L_2$. Alternatively, the signal line $L_1$ is connected to the power source line $L_3$, as by a resistor shown in dotted lines in FIG. 4. Accordingly, a field effect transistor may be suitably used for the transistors $T_3$, $T_4$, etc.

MERIT OF THE INVENTION

As stated above, in this invention, the junction line is comprised of a power source line, a grounding line and a signal line, and transistors are connected in series between the power source line and the grounding line so as to operate reversedly and complementarily with each other and signals are sent out from the junction point to the signal line. Therefore, the signaling speed is effectively raised because of the quick charge and discharge of the signal line. Further, the electric power is very conveniently supplied to the repeaters, etc. through the power source line and the grounding line. The instability in the electric potential of the signal line when the signal line is not used is diminished by connecting the signal line to the power source line or the grounding line through a resistor of high resistance.

I claim:

1. A signal transmission system for a fire alarm junction line whereby information on the conditions of operation of a plurality of fire detectors, signals for controlling equipment for prevention of spread of fire and exhaust of smoke, etc. are transmitted between repeaters to which fire detectors are connected and a receiving unit of a fire alarm system, wherein the junction line comprises three wires, one wire of said junction line being a power source line connected to a power source on the receiving unit side, another wire of said junction line being a grounding line connected to the ground, and the third wire of said junction line being a signal line which is connected to the junction point of a serial connection of a first switching element and a second switching element, said serially connected switching elements being connected between the power source line and the grounding line and operating complementarily with each other, and a binary signal of a zero potential and a power source potential being applied to the control terminals of the two switching elements to send out a signal to the junction line.

2. A signal transmission system for a fire alarm junction line as recited in claim 1, wherein a serially connected circuit constituted of a PNP transistor and an NPN transistor is provided on each of the fire alarm receiving unit side and the repeater side to be the first and the second switching elements, the base electrode of the PNP transistor is connected to the output of a NAND circuit, the base electrode of the NPN transistor is connected to the output of an AND circuit, an input binary signal is applied to one input terminal of the NAND circuit, said input binary signal is applied to one input terminal of the AND circuit through a NOT circuit, and a gate control signal is applied to the common connection of the other input terminal of the NAND circuit and the AND circuit.

3. A signal transmission system for a fire alarm junction line as recited in claim 1, wherein the power is supplied to the repeater through the power source line and the grounding line.

4. A signal transmission system for a fire alarm junction line as recited in claim 1, wherein the signal line is connected to the power source line or to the grounding line through a resistor with high resistance.

5. A signal transmission system for a fire alarm junction line as recited in claim 2, wherein the power is supplied to the repeater through the power source line and the grounding line.

6. A signal transmission system for a fire alarm junction line as recited in claim 2, wherein the signal line is connected to the power source line or to the grounding line through a resistor with high resistance.

7. A signal transmission system for a fire alarm junction line as recited in claim 3, wherein the signal line is connected to the power source line or to the grounding line through a resistor with high resistance.

* * * * *